US008035719B2

(12) United States Patent
Lehrman

(10) Patent No.: US 8,035,719 B2
(45) Date of Patent: *Oct. 11, 2011

(54) METHODS AND APPARATUS FOR PROVIDING PORTABLE PHOTOGRAPHIC IMAGES

(76) Inventor: Mikel A. Lehrman, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/463,642

(22) Filed: May 11, 2009

(65) Prior Publication Data

US 2009/0235563 A1 Sep. 24, 2009

Related U.S. Application Data

(63) Continuation of application No. 09/544,523, filed on Apr. 6, 2000, now Pat. No. 7,548,266.

(51) Int. Cl.
H04N 5/222 (2006.01)
H04N 5/225 (2006.01)
G06F 21/00 (2006.01)
A45C 1/06 (2006.01)

(52) U.S. Cl. ................ 348/333.11; 348/376; 348/207.1; 150/131; 713/182

(58) Field of Classification Search ................ 348/207.1, 348/231.7, 231.99, 231.6, 333.01, 333.02, 348/376; 150/131, 147; 713/182
See application file for complete search history.

(56) References Cited

U.S. PATENT DOCUMENTS

| 4,754,271 | A |   | 6/1988  | Edwards      |         |
|-----------|---|---|---------|--------------|---------|
| 4,887,161 | A | * | 12/1989 | Watanabe et al. | 348/231.7 |
| 4,888,648 | A |   | 12/1989 | Takeuchi et al. | |
| 5,039,846 | A |   | 8/1991  | Komaki       |         |
| 5,321,751 | A | * | 6/1994  | Ray et al.   | 705/72  |
| 5,396,340 | A |   | 3/1995  | Ishii et al. |         |
| 5,623,280 | A |   | 4/1997  | Akins et al. |         |
| 5,729,289 | A |   | 3/1998  | Etoh         |         |
| 5,760,386 | A |   | 6/1998  | Ward         |         |
| 5,775,558 | A |   | 7/1998  | Montalbano   |         |
| 5,801,970 | A |   | 9/1998  | Rowland et al. |       |
| 5,966,122 | A |   | 10/1999 | Itoh         |         |
| 6,068,183 | A | * | 5/2000  | Freeman et al. | 235/375 |
| 6,089,459 | A |   | 7/2000  | Eisele et al. |        |
| 6,173,897 | B1 |  | 1/2001  | Halpern      |         |
| 6,393,745 | B1 |  | 5/2002  | Miki         |         |
| 6,469,770 | B2 |  | 10/2002 | Hoshino et al. |       |
| 6,559,918 | B1 |  | 5/2003  | Lueder       |         |
| 6,577,760 | B1 |  | 6/2003  | Ohta et al.  |         |
| 6,856,353 | B1 |  | 2/2005  | Misawa       |         |

(Continued)

FOREIGN PATENT DOCUMENTS

EP 0 798 650 * 1/1997

(Continued)

*Primary Examiner* — Nhan T Tran
(74) *Attorney, Agent, or Firm* — Kramer Levin Naftalis & Frankel LLP

(57) ABSTRACT

Methods and apparatus for providing portable photographic images are described. The present invention includes a small, portable electronic display unit that may be placed within a wallet or purse. The display unit may include an input port for downloading digital images from a computer or digital camera. The display unit may also include one or more buttons to provide a user with the ability to select an image for display from a given set of digital images that have been stored in memory. The display unit may be preloaded with one or more digital images, or it may be configured to be loaded by a user. The digital images may, for example, include still digital photographs or short video clips that have been captured from a digital camera.

19 Claims, 4 Drawing Sheets

U.S. PATENT DOCUMENTS 7,548,266 B1 * 6/2009 Lehrman .................. 348/333.11

FOREIGN PATENT DOCUMENTS

| | | |
|---|---|---|
| EP | 0 798 650 A2 | 10/1997 |
| EP | 0 859 498 | 8/1998 |
| JP | 6-22805 | 2/1994 |
| JP | 8-114781 | 5/1996 |
| JP | 10-340066 | 12/1998 |
| JP | 11-4311 | 1/1999 |
| WO | WO 99/38117 | 7/1999 |
| WO | WO 99/54807 | 10/1999 |
| WO | WO 99/56463 | 11/1999 |

* cited by examiner

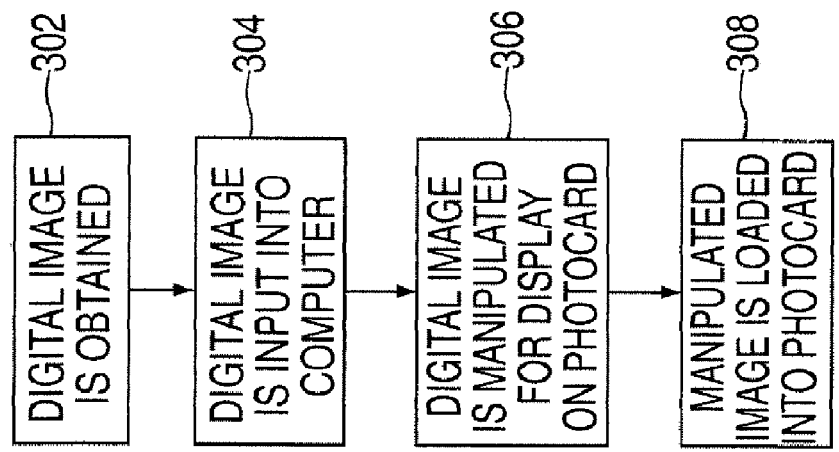
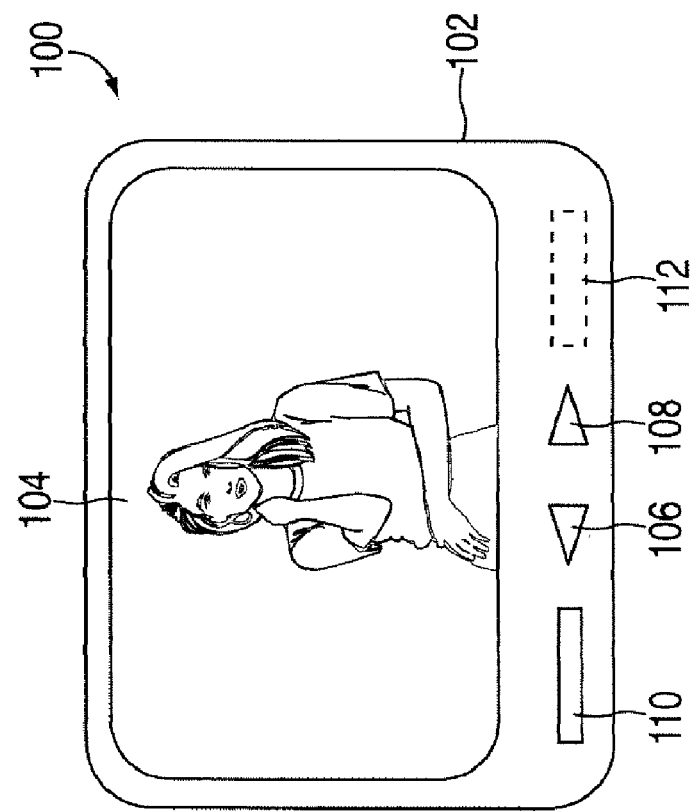

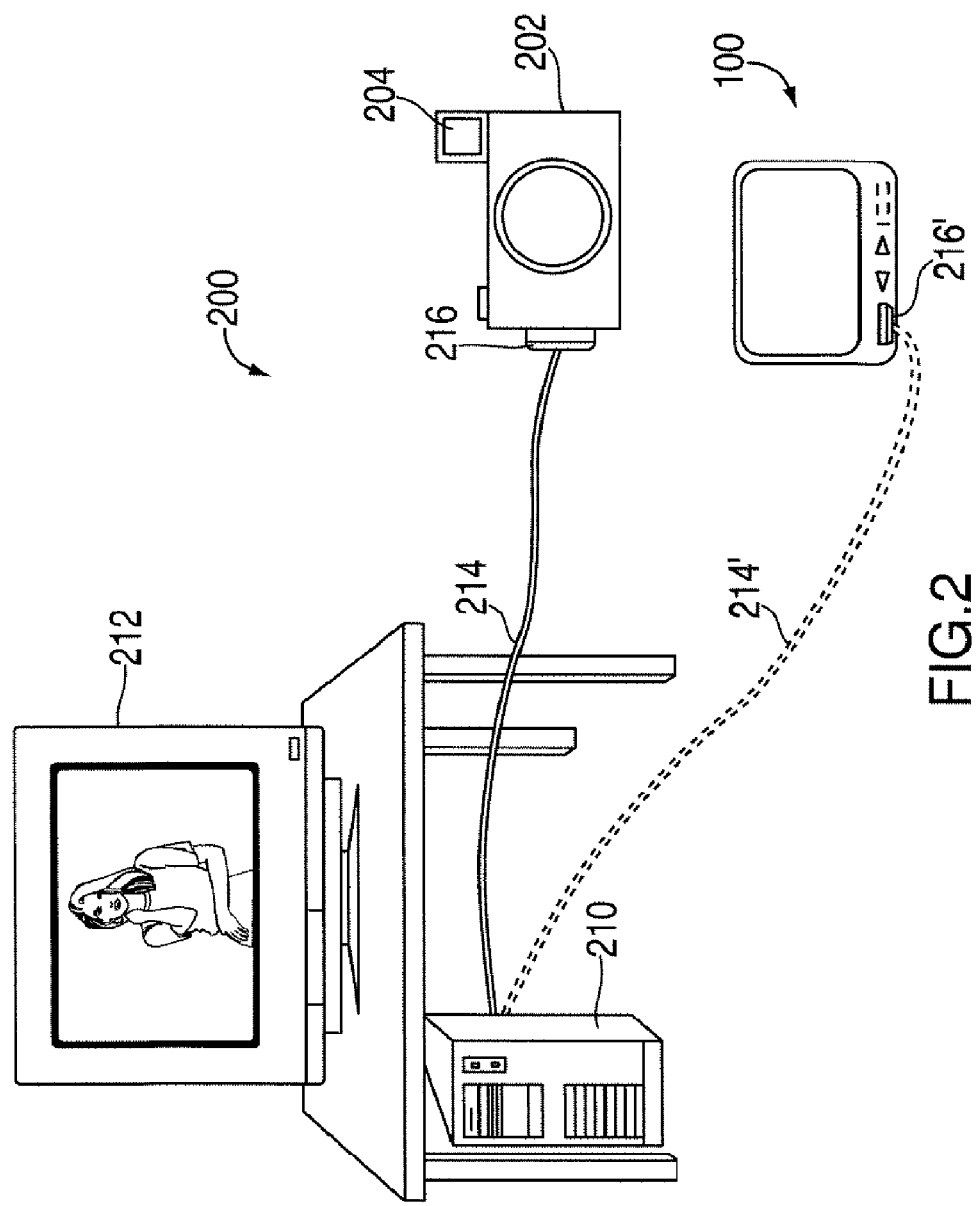

METHODS AND APPARATUS FOR PROVIDING PORTABLE PHOTOGRAPHIC IMAGES

CROSS-REFERENCE TO RELATED APPLICATIONS

This application claims the benefit of U.S. patent application Ser. No. 09/544,523, filed on Apr. 6, 2000, now U.S. Pat. No. 7,548,266, which is hereby incorporated by reference herein in its entirety.

BACKGROUND OF THE INVENTION

The present invention relates to methods and apparatus for keeping and displaying photographic images. More particularly, the present invention relates to the storage of digital photographic images in portable devices that may, for example, be carried in a wallet or purse.

Photographs, since their inception, have always had a special place in society. They provide a means for capturing special moments and/or places in people's lives, or are utilized in commercial applications to better explain things where "a picture is worth a thousand words." In today's society, the immense growth of digital photography and the Internet has caused explosion the storage and transmission of photographic images. For example, it is now common for pictures of newborn children to be displayed on a family website only hours after the birth has occurred. In other instances, family photographs are exchanged as e-mail attachments to family members in different parts of the world.

While the use of the Internet and digital images has made it easier to distribute photographic images, such techniques have not been able to address the problem of having photographs in one's possession at any place and at any time. For example, when a purse or wallet is open, there is typically one or more family photographs. The photos are often old and worn because they may simply be in a stack. In other circumstances, one of the pictures may be displayed all of the time behind a transparent piece of plastic, however, these windows also yellow and appear to lose some of their transparency over time. Moreover, every time the user wants to show the pictures to someone else, they must be pulled out of the purse or wallet. This results in additional wear and tear on the pictures.

It should also be noted that pictures are commonly developed in larger sizes than wallet size, such as, for example, four inches by six inches. When someone wants to keep a particular picture in their possession, they either cut the larger picture to fit the wallet, or they must take the negative to a photo processor and have a wallet-sized print made. In view of the difficulty in getting proper "wallet-sized" pictures, the pictures in the purse or wallet typically become quickly outdated, and often are never replaced.

For at least the above reasons, it is an object of the present invention to provide methods and apparatus that enable people to easily carry multiple photographic images.

It is also an object of the present invention to provide methods and apparatus for storing and displaying photographic images in which the images can easily be updated.

It is still a further object of the present invention to provide methods and apparatus for storing and displaying a fixed set of photographic images.

SUMMARY OF THE INVENTION

The above and other objects of the present invention are accomplished by the methods and apparatus described herein in a portable electronic photo album. The electronic photo album of the present invention includes a small, portable, flexible display unit, and a limited set of buttons or like devices for determining which image is shown on the display. The display is preferably a somewhat flexible color liquid-crystal display (LCD) that may be supported by a thin, hard shell. The device is small enough, and light enough to be carried in a wallet or purse, and is substantially resistant to damage that may be caused, for example, by someone sitting on the wallet. Thus, it may be preferable for the device to be approximately the size of a standard credit card.

The portable photo album of the present invention may be downloadable from a computer using standard or specialized interface cables. It may be preferable, for the convenience of the user, to utilize the same interface cable as is used with many digital cameras. For example, Hewlett Packard manufactures a standard nine-pin RS-232 interface cable, which may be used with many digital cameras, such as the HP Photosmart C200 Digital Camera. The portable photo album may also be downloaded directly from a digital camera, from digital still images captured by a video camera, or from image stored on conventional FLASH memory cards (that currently are in wide spread use with digital cameras). It should also be noted that while digital images are what is being stored, conventional photographs may also be used, provided they are converted to digital form by using, for example, a flat bed scanner.

In other embodiments of the present invention, digital images are permanently preloaded and stored on the portable photo album—i.e., users do not have the ability to load pictures into the device. These images may be, for example, photographs of a particular band, whereby the portable photo album would be sold to fans of that particular band as trading cards are traditionally sold. The applications for permanently stored images are wide-ranging, and may include, for example, sports teams, sports highlights, a new line of clothes offered by a particular retailer (in which case, the portable photo albums may be given away as part of an advertising campaign), or a series of photos depicting children's characters or nursery rhymes.

Other applications of non-user loadable photo albums may include being directly integrated with a credit card, whereby advertising would be displayed every time the card was used. In that case, card issuers, may issue new cards more frequently than is currently done as advertisers change. Additionally, "smart chip" technology may be utilized—smart chips, which are well known in the area of credit cards, are ultra-thin processors that are located on the face of a credit card. Information may be downloaded into these processors using, for example, bank machine kiosks. Under these circumstances, the credit card issuer could update the photo album advertising whenever the user utilizes one of these kiosks.

One advantage of a permanently fixed photo album, is the possible reduction in hardware requirements. Essentially, all that is needed is memory to store the images, working memory that includes what is being displayed, and processing circuitry that swaps pages from stored memory to display memory. The processor need not be a microprocessor, but instead could be a simple programmable logic device (PLD), such as those manufactured and sold by the Altera Corporation of San Jose, Calif. Moreover, the memory on the fixed photo albums can be optimized based on the number and resolution of the images being stored, to reduce memory costs.

Additional embodiments of the present invention may also include the storage of video clips instead of digital still images. These clips may be on the order of five to ten seconds, or more, whereby the length of time of the clip is determined, once again, based on the resolution of the images being displayed. For example, parents might want to keep a video clip of their child's first steps, assuming they were lucky enough to have the video camera ready to capture the moment, in their pocket. An additional consideration for video clips is frame rate, which contributes to the smoothness of the displayed video. The video clips may be downloaded from a computer, just as described above with respect to still images, or they may be downloaded directly from a digital video camera, or conventional video camera that includes the ability to capture digital clips.

The portable photo albums of the present invention also may include the ability to produce sound via micro or submicro electronic speaker components and audio chips. The integration of sound with still images and/or video clips may provide the users with advanced features, but the devices themselves may be more expensive and/or heavier and bulkier than silent photo albums. Such devices may be used, for example, as a singing birthday card in which family photos are displayed, or a customized birthday card in which the images/video clips are taken directly from the birthday party itself.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 1A is a schematic diagram showing one embodiment of a portable photographic image storage device constructed in accordance with the principles of the present invention;

FIG. 2 is a three-dimensional illustration of one embodiment of a portable photographic storage system utilizing the image storage device of FIG. 1;

FIG. 3 is a flow diagram of the process for loading digital images into the portable photographic storage system of FIG. 1.

DETAILED DESCRIPTION OF THE DRAWINGS

Figure 1B:
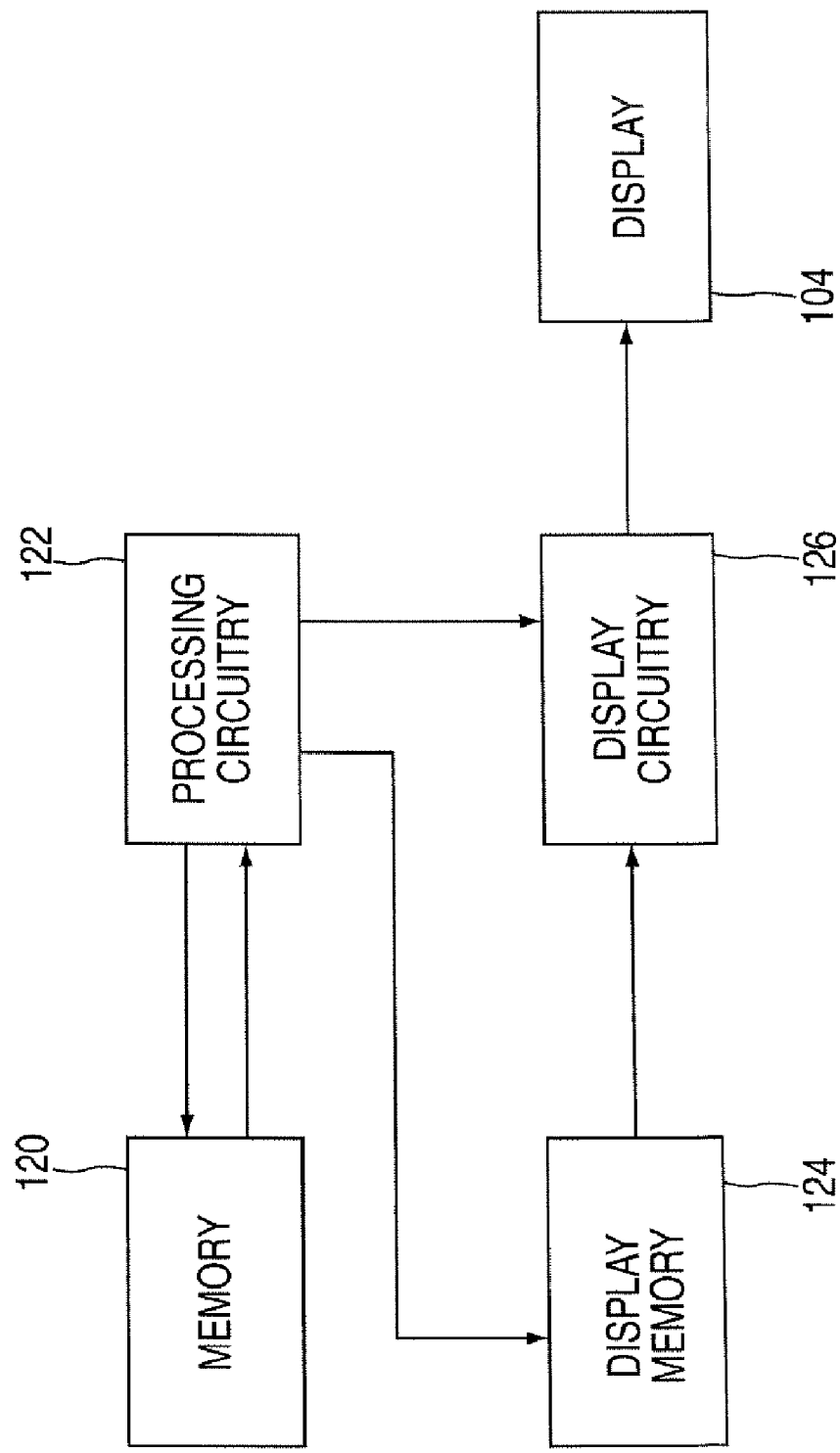
FIG. 1B is a schematic block diagram of representative circuitry of the portable photographic image storage device of FIG. 1A.

The methods and apparatus of the present invention for providing a portable system to store photographic images enable individuals to carry multiple digital photographs in a compact device that can easily be stored on one's person. The device is preferably credit card-sized, and contains enough memory to store multiple images. Of course, persons skilled in the art will appreciate that the number of images that may be stored may also vary depending on the resolution of the stored image, which affects the size of the electronic file corresponding to the image.

FIG. 1A shows a general representation of a portable device for storing one or more photographic images. Photocard 100, is preferably sized on the order of a credit card, or other like device, so that it can easily fit in existing wallets and purses. Photocard 100 includes a relatively rigid case 102 that may be utilized to provide the support structure for display 104. Case 102 should be rigid enough to protect display 104, but is preferably at least as flexible as a credit card so that it may easily be stored in a wallet without providing discomfort to the user. Display 104 is preferably a flexible liquid crystal display that can provide high resolution color images. Display 104 should also be resilient enough that it can withstand the stress typically associated with being in a wallet, such as, for example, being sat on for an entire day.

Photocard 100 also includes one or more buttons, such as index buttons 106 and 108. As illustrated in FIG. 1A, button 106 is intended to allow a person to review digital images going backwards in sequence, while button 108 is intended to allow a forward review of images. Persons skilled in the art will appreciate that, for example, to reduce cost and manufacturing complexity, a single button may be utilized to sequence through the stored images. Additionally, photocard 100 may be implemented without any physical buttons (in which case, buttons 106 and 108 would simply not be present), and instead may be implemented with one or more sequence "virtual buttons" which appear on display 104 and are implemented in software, rather than hardware. Under those circumstances, display unit 104 would be a touch screen responsive to touch inputs from the user. Moreover, photocard 100 may also include a magnetic strip 132 (which is located on the reverse side of the housing, see, for example, FIG. 1C), as is found on credit cards, so that photocard 100 could be used as a credit card, whereby the displayed images could be, for example, advertisements or promotions.

One of the advantages of photocard 100 is that it can fit inside a pocket, wallet, or purse. Another advantage is that it is a dedicated unit, constructed to simply display digital photographic or similar images. Accordingly, hardware requirements for photocard 100 are significantly reduced over conventional electronic devices. For example, conventional electronic devices often require microprocessors or other advanced processing circuitry to perform various functions. Photocard 100, on the other hand, only requires processing circuitry that simply moves data into and out of memory.

FIG. 1B shows an example of the circuitry that may be utilized to implement photocard 100. The circuitry includes memory circuitry 120, processing circuitry 122, display memory 124, and display circuitry 126. Memory 120 is used to store the digital images. Data is downloaded to it, or uploaded from it, by processing circuitry 122 along a bus, as is well known. The processing circuitry 122, takes blocks or pages of data from memory 120, that represent a digital image to be displayed on display 104. The data is then loaded into display memory 124 by processing circuitry 122, and a signal is provided to the display circuitry 126 (which typically includes driver circuitry). Display circuitry 126 then displays the data stored in display memory 124 on display 104.

The processing circuitry requirements of photocard 100 are significantly reduced over conventional electronic devices because a majority of the processing is simply memory access. No processing of the digital images is performed by photocard 100. Accordingly, processing circuitry 122 may be implemented using, for example, a programmable logic device (PLD), such as those sold by the Altera Corporation, or application specific integrated circuits (ASICs).

ASICs, in particular, are integrated circuits that are designed to perform a specific function, as opposed to devices which may be programmed to perform a variety of functions ASICs are substantially less expensive, and require substantially less supporting circuitry than conventional processing circuitry. Moreover, persons skilled in the art will appreciate that the present invention may be implemented using a single memory instead of memories 120 and 124. Under those circumstances, the processing circuitry could simply be designed to display the data from a given location upon startup. Then, additional images are displayed by simply incrementing, or decrementing, the memory location a single page.

Figure 1C:
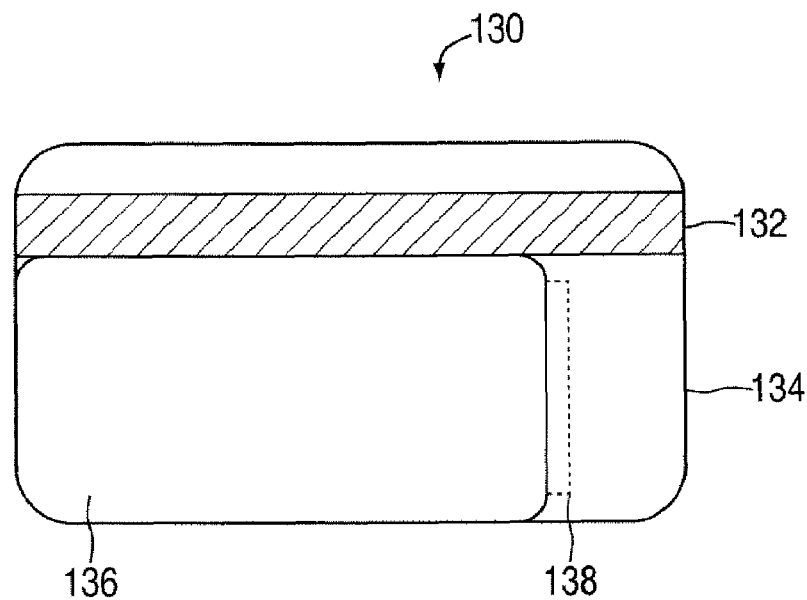
FIG. 1C is a schematic diagram showing an alternate embodiment of a portable photographic image storage device constructed in accordance with the principles of the present invention.

FIG. 1C shows another embodiment of the present invention in photocard 130. Photocard 130 may include everything previously described with respect to photocard 100, and shown in FIG. 1A. Photocard 130, however, includes body portion 134, which is substantially similar in size to a credit card, except that a segment is missing from the backside of body 134. The missing segment, as is shown in FIG. 1C, is filled in by a memory card 136, such as the FLASH memory cards currently utilized with many digital cameras. As shown in FIG. 1C, FLASH memory card 136 has been placed within the missing segment of body 134 so that the two portions, when mated together, are approximately the size and width of a credit card. Alternately, if the memory portion need be slightly thicker than a conventional credit card, the magnetic stripe portion of body 134 could still be the same size as a credit card so that magnetic stripe 132 could be swiped using conventional credit card readers. FLASH memory card 136 connects to the circuitry of photocard 130 via connector 138 (shown as a dashed line to indicate that it is, when mated, within body 134).

One advantage of photocard 130 is that no downloading capability need be provided. All photo processing and image storage would occur at the computer or digital camera (video or still), with the images to be displayed being loaded into the FLASH card. Photocard 130 need only have memory to display images, such as where images are paged from the FLASH card into display memory, and the LCD displays what is in display memory. Alternately, the dedicated processing circuitry could be configured to display images directly from FLASH memory card 132, in which case photocard 130 would have no memory at all. For shipping, storage, and carrying when no images are available, a dummy plug (not shown) could be utilized that plugs into the same connector as connector 138.

FIG. 2 shows an illustrative example of how a photocard 100 device could be used in an image processing system 200. In addition to photocard 100, FIG. 2 also shows a camera 202 and a computer 210. Camera 202 is preferably a digital camera, however, conventional film cameras may also be used without departing from the spirit of the present invention. Camera 202 may include a built-in flash unit 204, or it may be utilized with a conventional stand-alone flash unit (not shown). Computer 210 may be any type of computer running any type of operating system ("OS"), such as the Macintosh™ OS or Windows™ OS. Computer 210 also includes a monitor 212, that is preferably a color monitor, as well as a keyboard (not shown) and cursor input system, such as a mouse (not shown). Computer 210 may also include a conventional scanner (not shown), which may be used to scan conventional photographs for conversion into digital images.

Computer 210 includes software, besides the OS, that may be used to manipulate digital images. One well known software application for this purpose is, for example, Photoshop™ by Adobe. Digital image manipulation software permits a user to perform tasks such as cropping and rotation of digital images, as well as image quality enhancements (such as the elimination of "red eye"). Moreover, these programs also typically provide the user with the ability to alter the digital images by, for example, placing one person's face on someone else's body. Another important feature of these programs is the ability to save the digital image in a different format and/or resolution than the image taken by camera 202 or scanned by the scanner.

Digital image manipulation programs also typically include the ability to provide add-on software. One such piece of add-on software that may be provided in conjunction with the present invention is a software guide for manipulating images so that they may be best displayed on photocard 100. For example, the add-on software may include the ability to display a window on monitor 212 that displays exactly what would appear if the same image were displayed on photocard 100 on display 104, in exactly the same size. Additionally, the add-on software could also inform the user how much memory would be required for storage and display of the digital image at varying resolutions and color quality. For example, it is well known that a digital image displayed in "millions of colors" takes up significantly more memory that an image displayed in 16 or 256 colors. While photocard 100 can be provided with enough memory to display images at even the highest of resolutions, the amount of memory provided is directly tied to the overall cost of the device. Accordingly, some models may offer, for example, sixteen megabytes of memory, while others may only offer four megabytes.

Camera 202 may be connected to computer 210 for downloading digital pictures into computer 210 via a cable 214, which has a connector 216 for connection to camera 202 (and an additional connector (not shown) for connection to computer 210. Also shown in FIG. 2 are dashed lines representing cable 214' having connector 216'. The dashed lines are intended to indicate that the cable used to connect camera 202 to computer 210 may in fact be the same cable that also connected photocard 100 to computer 210. While such a configuration may be preferable, it is not required to practice the present invention. One of the advantages of having a single cable that connects to both camera 202 and photocard 100 is the ability to leave the single cable connected to computer 210, regardless of what is being connect to it. As is well known, often, computers have a limited number of I/O ports that cables can be connected to. Thus, the use of a common cable and interface for both the camera and photocard eliminates the undesirable requirement of constantly having to gain access to the back of computer 210 for reconfiguration of the cables.

Use of system 200 is described with respect to the flow diagram shown in FIG. 3. Initial step 302 for the use of image processing system 200 is that one or more digital images are obtained. These images may be obtained via a camera such as camera 202 shown in FIG. 2. If the camera used is a digital camera, then the photographs are already in digital format, and the process may continue. If, however, the photographs were taken with a conventional camera, the images must be digitized. This can be done in many known ways. For example, the standard photograph may be scanned using a conventional flat bed scanner and scanner software. Alternately, the film may be sent to a photoprocessor such as Kodak™, who offers individuals the ability to receive their photographs in several digital formats, such as CD-rom, conventional floppy disks, and as downloadable files on the Internet. Under any of those circumstances, the image is now available in a digital format.

The second step 304 is that the digital image is loaded into computer 210, via, for example, cable 214. While the present invention includes this step, persons skilled in the art will appreciate that individuals may also load images directly from a digital still or video camera into photocard 100. The elimination of the computer, however, may reduce the quality of the images displayed on photocard 100. Once the digital images are loaded into computer 210, they may be manipulated in step 306 to further enhance the images that are to be displayed on photocard 100. For example, the image may be cropped and the number of colors reduced so that an increased number of images may be loaded into photocard 100, based on the fixed memory of the device.

Once the images have been manipulated, a program may be run from the computer that, in a step 308, loads the images into photocard 100, either sequentially, or in a particular order that may be set up by a user through software located on computer 210. Another alternate method of transferring images into photocard 100 may be through the use of infrared I/O port 112 (shown as a dashed box, indicating that this may be optionally added to photocard 100, as illustrated in FIG. 1A). Computers and/or digital cameras could also include infrared I/O ports so that digital images can simply be "beamed" from one device to another.

Figure 4:
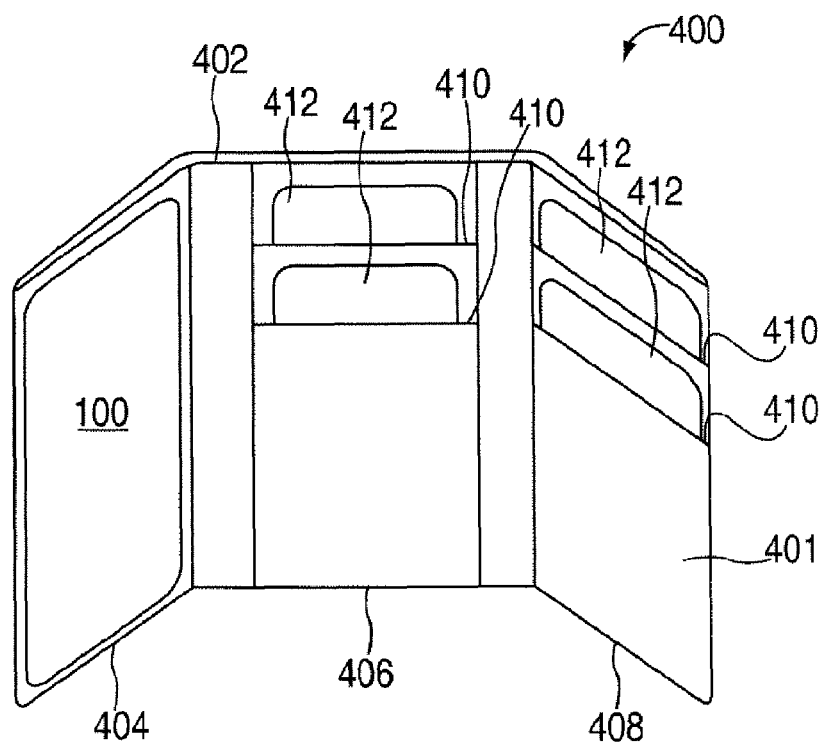
FIG. 4 is a three-dimensional illustration of an alternate embodiment of a portable photographic image storage wallet constructed in accordance with the principles of the present invention.

FIG. 4 shows an alternate embodiment of the present invention in photocard wallet 400. Photocard wallet 400 includes a body 401 that may be formed of a material such a leather into a three-fold configuration (as shown) or other configurations, such as a two-fold (not shown). Wallet 400 includes four sections, which are labeled sections 402, 404, 406, and 408. Section 402 refers to the area in the wallet where money is usually located. Sections 406 and 408 are conventional wallet sections in that they may include, for example, slots 410 which are configured to carry materials such as credit cards 412. Built into section 404, however, is photocard 100 which can display digital photographic images. Persons skilled in the art will appreciate that, for convenience and clarity, while the previous discussion of photocard 100 is equally applicable with respect to wallet 400, the photocard actually placed within wallet 400, may be different than that previously described. For example, paging switches 106 and 108 may be located in a different location so that they are aligned with wallet 400 when it is open as shown in FIG. 4.

Persons skilled in the art will thus appreciate that the present invention can be practiced by other than the described embodiments, which are presented for purposes of illustration and not of limitation, and the present invention is limited only by the claims which follow.

I claim:

1. A portable electronic photo album comprising:
   a housing structure, having first and second planar side surfaces substantially parallel to each other and a region of a substantially uniform thickness between them that is at least small enough so that the housing can be swiped through a conventional credit card swiping device by a user, comprising:
   an electronic display;
   a magnetic strip storing credit card information operable to be swiped through a credit card reader;
   a storage device operable to store a plurality of user-provided digital images;
   a first input device operable to receive inputs that indicate which one or more images of the plurality of user-provided images are to be displayed; and
   processing circuitry operable to cause the electronic display to display the indicated selection of images.

2. The portable electronic photo album of claim 1, wherein the first input device comprises:
   at least one micro switch embedded on the first planar surface.

3. The portable electronic photo album of claim 1, wherein the storage device comprises:
   electronic memory embedded within the region.

4. The portable electronic photo album of claim 1, wherein the storage device comprises:
   a removable memory card.

5. The portable electronic photo album of claim 1, wherein the storage device is operable to store at least one video clip for displaying on the electronic display.

6. The portable electronic photo album of claim 1, further comprising:
   a second input device operable to receive at least one user-provided image; and
   transfer circuitry operable to deliver the at least one user-provided image from the second input device to the storage device.

7. The portable electronic photo album of claim 6, wherein the second input device comprises an infrared port.

8. The portable electronic photo album of claim 1, wherein the electronic display comprises a flexible liquid crystal display.

9. The portable electronic photo album of claim 1, wherein the electronic display comprises a touch screen operable to receive at least one user input.

10. The portable electronic photo album of claim 1, wherein the housing structure further comprises:
    a speaker operable to play an audio clip.

11. The portable electronic photo album of claim 1, wherein the housing structure further comprises:
    a connector component operable to couple the portable electronic photo album to a user-device.

12. The portable electronic photo album of claim 11, wherein the at least one user-provided digital image is downloaded from the user-device.

13. The portable electronic photo album of claim 11, wherein the user-device comprises one of a computer system, a camera, a scanner, and an external storage device.

14. The portable electronic photo album of claim 11, wherein the user-device comprises a second electronic display operable to display the at least one user-provided digital image.

15. The portable electronic photo album of claim 1, wherein the portable electronic photo album comprises a greeting card.

16. The portable electronic photo album of claim 15, wherein the portable electronic photo album comprises a singing greeting card, and wherein the housing structure further comprises:
    a speaker operable to play an audio clip.

17. A credit card-sized system comprising:
    a display device;
    a magnetic strip storing credit card information operable to be swiped through a credit card reader;
    a storage device operable to store a plurality of user-provided digital images;
    a working memory operable to store a particular digital image of the plurality of user-provided digital images for displaying on the display device; and
    a processor operable to swap the particular digital image stored in the working memory with another digital image of the plurality of user-provided digital images.

18. A method for displaying user-provided digital images on a portable photo album comprising:
    storing a plurality of user-provided digital images in a memory;
    receiving instructions from a processor to display a particular digital image of the plurality; and displaying the particular digital image on a display, wherein the memory, processor, and display are comprised in a housing structure of the portable photo album having first and second planar side surfaces substantially parallel to each other and a region of a substantially uniform thickness between them that is at least small enough so that the housing structure can be swiped through a conventional credit card swiping device by a user, wherein credit card information is stored in a magnetic strip located in the housing structure.

19. The method of claim 18, further comprising:
receiving the plurality of user-provided digital images from a user-device in communication with the portable photo album.

\* \* \* \* \*